INVENTOR
J. K. MILLS
BY *Roy M. Porter Jr.*
ATTORNEY

April 20, 1965  J. K. MILLS  3,179,901
POWER CONVERTER USING SWITCHING TRANSISTORS DRIVEN
BY AN INDUCTANCE-TIMED FEEDBACK NETWORK
Filed Sept. 29, 1961  2 Sheets-Sheet 2

INVENTOR
J. K. MILLS
BY
ATTORNEY

United States Patent Office 3,179,901
Patented Apr. 20, 1965

3,179,901
POWER CONVERTER USING SWITCHING TRANSISTORS DRIVEN BY AN INDUCTANCE-TIMED FEEDBACK NETWORK
John K. Mills, Morristown, N.J., assignor to Bell Telephone Laboratories, Incorporated, New York, N.Y., a corporation of New York
Filed Sept. 29, 1961, Ser. No. 141,799
5 Claims. (Cl. 331—113)

This invention relates to electrical power conversion apparatus and more particularly, although in its broader aspects not exclusively, to apparatus for converting a first direct-current voltage into a second direct-current voltage of altered magnitude.

In modern electrical and electronic systems, it is often necessary to convert a direct-current voltage from an available source into a second direct-current voltage having a more desirable magnitude. A common method of accomplishing such voltage conversion is to employ "inverter" circuitry for intermittently interrupting or inverting the direct-current supply voltage in order to create alternating-current energy which, by means of known voltage multiplication and rectification techniques, may be in turn converted into a second direct-current voltage of increased or decreased magnitude.

Although it is well known that electromechanical devices or vacuum tubes may be used to accomplish the desired direct-current to alternating-current conversion, recent advances in semiconductor technology have shown that solid-state switches, such as junction transistors, may be used to advantage in such applications. A discussion of the operating characteristics of these devices appears in an article entitled "Junction Transistors Used as Switches" by R. L. Bright which appeared on pages 111 to 121 of the March 1955 issue of "The Transactions of the A.I.E.E."

The alternating-current energy produced by a transistorized inverter may be converted into a direct-current voltage by means of known networks which employ diodes and capacitors to achieve rectification and voltage multiplication. Power conversion apparatus of this type is disclosed in U.S. Patent 2,975,353 which issued to F. G. R. Rockstuhl on March 14, 1961. In such voltage multiplication networks, the size of the capacitors required is dictated to a large extent by the frequency of the alternating-current input voltage. From this standpoint, it is desirable that the frequency derived by the D.C. to A.C. inverter be as high as possible in order to minimize the cost of the voltage multiplication network. Transistor switch inverters, however, are normally limited in frequency due to the finite time required to switch a saturated transistor into the nonconductive state. This phenomenon results from the fact that the excess minority carriers existing in the base region must be absorbed before the device can be "cut-off." Although the response time can be shortened by minimizing the dimensions of the base region, in the present state of the art the response time of those transistors suitable for power conversion devices remains as a significant frequency limitation.

A second disadvantage arising out of the minority carrier storage in a saturated transistor is that a nonconductive transistor may be switched into conduction more rapidly than a saturated transistor may be cut-off. In consequence, if an attempt is made to change the conductivity state of a pair of transistors simultaneously (one of the transistors being previously cut-off and the other saturated), the condition will arise where, for a short period, both transistors are in a conductive state at the same time. Since it is quite common for a pair of transistors to be serially connected across the direct-current voltage source, the low impedance path encountered when both are conducting allows an impulse of current to flow through the transistors. While this impulse of current may be of such short duration that it will not damage the transistors by itself, it does, nevertheless, provide a significant increase in the total amount of heat which must be dissipated by the transistors.

It is a principal object of this invention to convert direct-current energy into electrical energy of another form more efficiently and more economically.

A further object of the invention is to increase the frequency of operation of transistorized power conversion apparatus.

A still further object of the invention is to provide means for rapidly reversing the conductivity state of a saturated semiconductor switch.

In accordance with a principal feature of the invention, a plurality of transistor switches, each of which is used to directly connect a direct-current source to a load, are switched into a nonconductive state and a saturated conductive state in alternation by the action of a novel feedback arrangement. In a principal aspect, the feedback arrangement takes the form of a transformer whose primary winding is serially connected with the load, whose secondary windings are arranged to drive the base electrodes of the transistor switches, and which employs an inductance connected in parallel with the primary winding. Extremely rapid switching is made possible by the feedback device due to its ability to bring a saturated transistor substantially out of saturation before switching is initiated.

Other objects and features of the present invention will become apparent upon consideration of the following detailed description of several embodiments of the invention when taken in connection with the following drawings in which.

Figure 1:
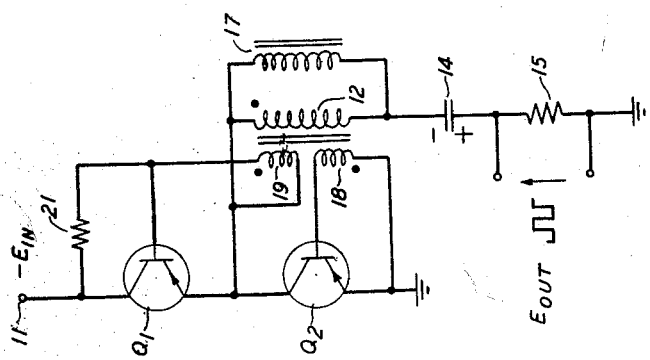
FIG. 1 is a schematic representation of an inverter circuit which embodies the invention and which is capable of converting direct-current energy into "square-wave" alternating-current energy.

In the embodiment of the invention shown in FIG. 1 of the drawings, the emitter electrode of transistor $Q_1$ is directly connected to the collector electrode of transistor $Q_2$. The emitter electrode of transistor $Q_2$ is grounded. The collector electrode of transistor $Q_1$ is connected to terminal 11 which suplies a negative direct-curent input voltage. The junction of the two transistors is connected to ground by means of the serially connected combination of primary winding 12, capacitor 14 and load resistance 15. An inductance 17 is connected in parallel with primary winding 12. The emitter and base electrodes of transistor $Q_2$ are connected by means of secondary winding 18. Similarly, the emitter electrode of transistor $Q_1$ is connected to its base by secondary winding 19. Starting resistance 21 connects the collector and base of transistor $Q_1$.

The arrangement shown in FIG. 1 is capable of converting a direct-current input voltage into a "square-wave" alternating-current voltage. The manner in which transistor switching is accomplished in the inverter circuit represented by FIG. 1 typifies the operation of the remaining circuits. In order to understand the operation of the device, consider that the negative input voltage has not yet been applied to terminal 11, and consequently, that neither transistor $Q_1$ or $Q_2$ is in a conductive state. When the negative input voltage is applied to terminal 11, starting resistance 21 applies a "forward bias" to the base of transistor $Q_1$. Since transistor $Q_2$ is cut off, current will flow from ground through resistance 15, capacitor 14, primary winding 12 and the collector emitter path of transistor $Q_1$ to the negative input terminal 11. In accordance with the dot convention shown on the drawing, as the current through the feedback transformer's primary winding 12 increases, the voltage induced in the secondary winding 19 drives transistor $Q_1$ still further into conduction while transistor $Q_2$ is driven further into "cut-off" by the voltage induced in secondary winding 18. The current rises very rapidly and transistor $Q_1$ saturates; i.e., it is now characterized by having a very small voltage drop which is substantially independent of the magnitude of current flowing through it. Since the voltage drop across the primary winding 12 is also very small (the impedance of the primary is merely the reflected base-to-emitter impedance of the transistors and, consequently, is quite small) the magnitude of current flow is determined primarily by the impedance of the load and by the capacitor. Since the RC time-constant of the load circuit is quite large relative to the times being considered here, the current may be considered to be substantially constant.

The shunt inductor 17 is characterized by having a much smaller resistance yet a much larger inductance than the impedance looking into the primary winding 12. Initially, therefore, the current applied to the parallel combination of primary winding 12 and inductance 17 will, for the most part, flow through the primary winding. As current continues to flow, however, the inductor 17 will shunt an increasing portion of the current around the primary winding 12. Since the primary winding is being "starved" of current it now begins to decrease the forward bias applied to the base of transistor $Q_1$ thereby bringing it out of saturation. The current, since it is still limited only by load impedance, remains constant, however, until $Q_1$ comes out of saturation and begins to exhibit a voltage drop. As the voltage drop across $Q_1$ increases, the current flowing through the parallel combination of the primary winding and shunt inductor decreases. The current cannot decrease in the shunt inductor instantly however so that the inductor induces a "circulating current" through the primary winding in the opposite direction of the original current flow. This circulating current immediately cuts off transistor $Q_1$—and it does this very rapidly since $Q_1$ was already brought out of saturation—and turns on transistor $Q_2$. The capacitor 14 which was charged during the previous half-cycle when transistor $Q_1$ was in conduction now discharges through transistor $Q_2$. Both transistors eventually switch again by the same action and the cycle is continued. Because the switching frequency is quite high in comparison to the discharge time constant of capacitor 14, that capacitor actually charges and discharges very little during a single cycle of operation. Thus, after a short period of operation the voltage across the capacitor 14 remains at a steady-state value substantially equal to one-half of the input voltage. The voltage appearing across the load resistance 15 is an excellent square wave whose peak-to-peak amplitude is approximately equal to the input voltage.

As may be appreciated from the foregoing discussion, the feedback arrangement contemplated by the invention is capable of achieving extremely rapid transistor switching times due to its ability to bring a conducting transistor out of saturation before switching is initiated. In practice, the function of the shunt inductor may be provided by special design of the feedback transformer in which a separate inductor is replaced by an equivalent shunt inductance in the transformer. Since the feedback transformer merely supplies base drive to the semiconductor switches, it may be quite small in comparison to the size of the power transformer which would be required to deliver power to the load.

Figure 2:
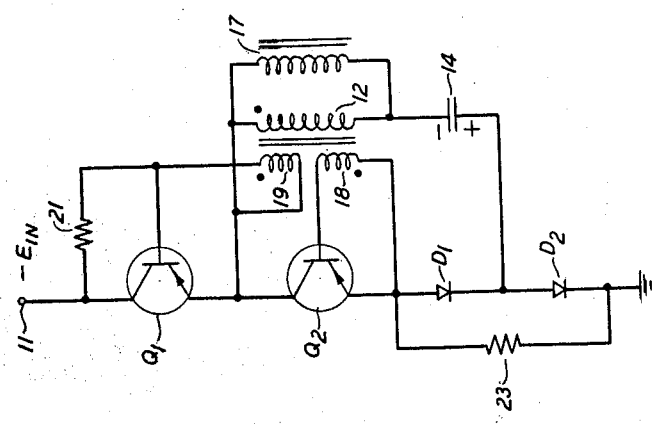
FIG. 2 is a schematic representation of an active voltage divider circuit which is capable of delivering an output voltage approximately equal to half the input voltage and of the same polarity.

A particularly useful embodiment of the invention is shown in FIG. 2 of the drawings. The circuit is an "active voltage divider" which is capable of delivering a direct-current output voltage whose magnitude is equal to half the input voltage. The active divider is somewhat similar to the arrangement shown in FIG. 1 and the same reference numerals are used to refer to those components whose position and operation is identical in both circuits. In FIG. 2, an output arrangement comprising diodes D1 and D2, and load resistance 23 replaces the load resistance 15 shown in FIG. 1. Diodes D1 and D2 are connected in series between the emitter electrode of transistor $Q_2$ and ground. Both diodes are poled in the direction of positive current flow from the emitter electrode to ground. Capacitor 14 connects the juncture of the two diodes to the primary winding 12 of the feedback transformer. Load resistance 23 is connected between the emitter electrode of transistor $Q_2$ and ground, paralleling the two diodes.

The operation of the feedback transformer to produce periodic transistor switching is identical to the operation of the circuit shown in FIG. 1 which was previously discussed. As before, transistors $Q_1$ and $Q_2$ are cut off and turned on in alternation. In the arrangement of FIG. 2, during the half-cycle when transistor $Q_1$ is conducting and transistor $Q_2$ is cut off, a positive current flows from ground through load resistance 23, diode D1, capacitor 14, primary winding 12 and the emitter-collector path of transistor $Q_1$ to terminal 11. During the next half-cycle, transistor $Q_2$ conducts and transistor $Q_1$ is cut off. Since capacitor 14 was charged during the previous half-cycle, it now discharges through the circuit path which consists of diode D2, load resistance 23, the collector-emitter path of transistor $Q_2$ and the primary winding 12 of the feedback transformer. It should be noted that regardless of which transistor is conducting, the current at all times flows in the same direction through load resistance 23. In consequence, a D.C. voltage appears across this resistance. The magnitude of this D.C. output voltage, since the voltage across capacitor 14 is equal to one-half of the input voltage, is also equal to one-half of the input voltage.

Figure 3:
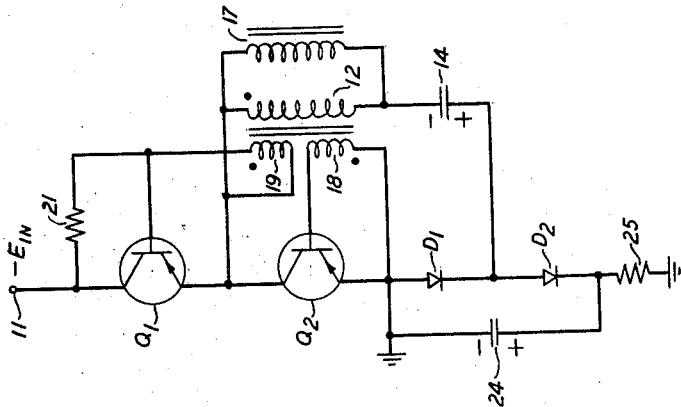
FIG. 3 is a schematic representation of a polarity inversion circuit embodying the invention.

The D.C.-D.C. polarity reversing converter which is shown in FIG. 3 of the drawings provides an output voltage equal in magnitude to the input voltage but of opposite polarity. As before, like reference numerals have been used to designate those components whose operation and position is unchanged from those devices previously discussed. In this embodiment of the invention, the emitter electrode of $Q_2$ is grounded, a capacitance 24 is connected between the emitter electrode of transistor $Q_2$ and the cathode of diode $D_2$ and a load resistance 25 is connected from the cathode of diode $D_2$ to ground.

In FIG. 3 when transistor $Q_1$ conducts, positive current flows from the grounded emitter terminal of transistor $Q_2$ through diode D1, capacitor 14, primary winding 12 and the emitter-collector path of transistor $Q_1$ to the negative input terminal 11. During the next half-cycle, transistor $Q_1$ is cut off thereby allowing current to flow from the positively charged terminal of capacitor 14 through diode D2, capacitor 24, the emitter-collector path of transistor $Q_2$ and the primary winding 12. Since the impedances represented by diode D2, the transistor $Q_2$ and the primary winding 12 are quite small, the voltage which originally existed across capacitor 14 is now applied to capacitor 24 and to the load resistance 25. As the circuit continues to operate the voltages across both capacitors 14 and 24 are equal to the magnitude of the input voltage. The voltage applied to load resistance 25 is, however, of opposite polarity to the input voltage.

Figure 4:
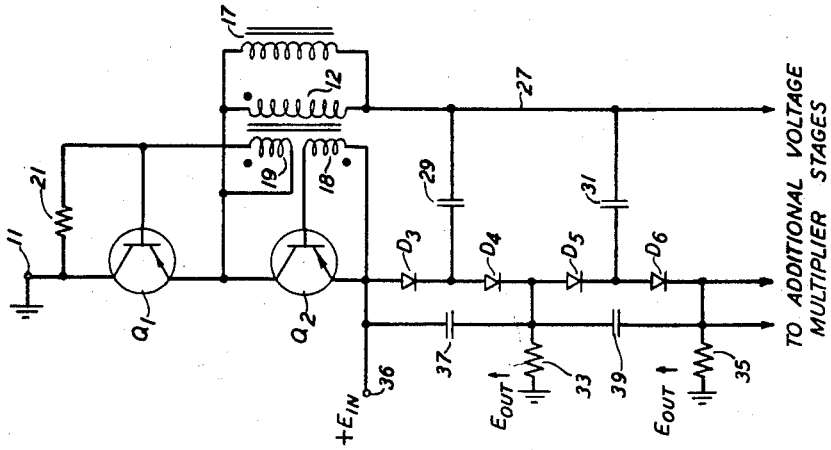
FIG. 4 is a schematic representation of a D.C. to D.C. converter embodying the invention which delivers a plurality of output voltages at multiples of the input voltage.

The arrangement shown in FIG. 4 of the drawings is capable of providing a plurality of D.C. output voltages whose magnitudes are multiples of the D.C. input voltage. As shown in the drawing, diodes D3, D4, D5 and D6 are connected in series and poled in the direction of positive current flow away from the emitter electrode of transistor $Q_2$. A conductor 27 is connected to the primary winding 12 and a capacitor 29 is connected from the conductor 27 to the junction of diodes D3 and D4. A capacitor 31 connects conductor 27 to the junction of diodes D5 and D6. A load resistance 33 is connected between the junction of diodes D4 and D5 and ground. A second load resistance 35 is connected between the cathode of diode D6 and ground. Terminal 11 which, in the other embodiments, was connected to a negative input voltage is grounded in the arrangement of FIG. 4. A positive input voltage is applied to terminal 36 which is connected to the emitter electrode of transistor $Q_2$. A capacitance 37 is connected between the emitter electrode of transistor $Q_2$ and the junction of diodes D4 and D5. A capacitance 39 connects the junction of diodes D4 and D5 with the cathode of diode D6.

In order to simplify the discussion of the operation of the device shown in FIG. 4, it will be helpful to realize that, because of the manner in which transistors $Q_1$ and $Q_2$ are alternately switched on and off, the conductor 27 is connected to ground and to the positive input terminal 36 in alternation. Furthermore, consider that the circuit has just been placed in operation such that none of the capacitors have been previously charged. When the positive input voltage is applied to terminal 36, transistor $Q_1$ will be the first to conduct thereby grounding conductor 27. At this time, current will flow from the positive input terminal 36 through diode D3 charging capacitor 29 and through diodes D3, D4 and D5 charging capacitor 31. Both capacitors 29 and 31 will be charged to a voltage nearly equal to the positive input voltage. During the next half-cycle, conductor 27 is connected to the positive input potential and the voltage at the junction of diodes D3 and D4, as well as voltage at the junction of diodes D5 and D6, rises to a value twice the magnitude of the input voltage. At this time, diode D4 conducts and a voltage nearly equal to the input voltage is applied across capacitor 37.

It should be noted that, at this point, the voltage across load resistance 33 is equal to twice the input voltage since the voltage across capacitor 37 added to the input voltage is applied to load resistance 33. In the next half-cycle when conductor 27 is again grounded, capacitor 29 is recharged to a voltage approximately equal to the positive input voltage but a voltage of nearly twice the input voltage (that is, the voltage across load resistance 33) is applied through diode D5 to capacitor 31. When conductor 27 is once again connected to the positive input terminal, a voltage three times the positive input voltage is applied to load resistance 35 by capacitor 31 through diode D6.

Additional voltage multiplier stages may be added by merely continuing the circuit configuration shown. In this manner, the arrangement shown in FIG. 4 is capable of producing any desired number of output voltages which are approximate multiples of the input voltage. Not all of the outut voltages need to be utilized, however. For instance, if a 150-volt output voltage was desired from a 50-volt supply, load resistance 33 could be omitted.

Figure 5:
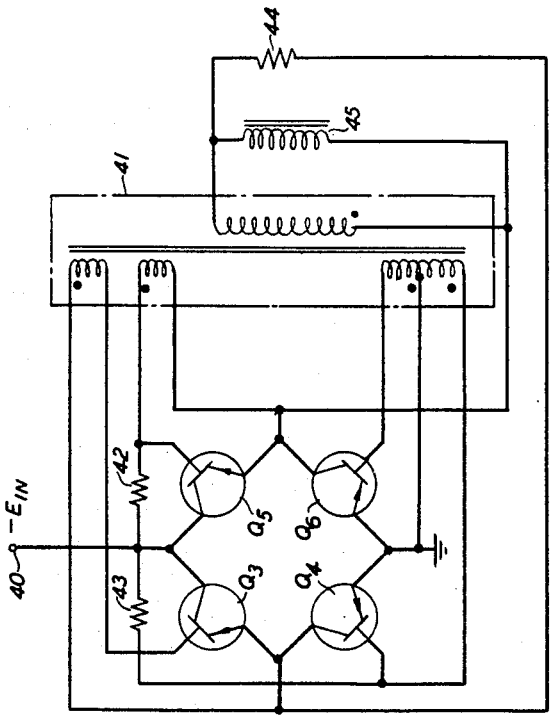
FIG. 5 is a schematic representation of a bridge-type power conversion circuit which embodies the invention.

The embodiment of the invention shown in FIG. 5 is the "full wave" or "bridge form" of the circuit shown in FIG. 1 and, like the device of FIG. 1, produces a "square wave" alternating-current output voltage.

As shown in FIG. 5, four transistors $Q_3$, $Q_4$, $Q_5$ and $Q_6$ are connected to a common bridge configuration. The emitter electrodes of transistors $Q_4$ and $Q_6$ are connected together and grounded while a negative input voltage is applied to terminal 40 which is connected to the collector electrodes of both transistors $Q_3$ and $Q_5$. The base electrode of each transistor is connected to its emitter electrode by means of a secondary winding of the feedback transformer 41. A starting resistance 42 connects the base electrode of transistor $Q_5$ to negative input terminal 40 and a second starting resistance 43 connects the base of transistor $Q_4$ to negative input terminal 40. The primary winding of the feedback transformer 41 is connected in series with a load resistance 44 between the emitter of transistor $Q_5$ and the emitter of transistor $Q_3$. As before, an inductance 45 is connected in parallel with the primary winding of the feedback transformer 41.

To facilitate understanding of the embodiment of the invention shown in FIG. 5, assume that the negative input voltage has not yet been applied to terminal 40. When the supply voltage is applied, starting resistances 42 and 43 forward bias transistors $Q_4$ and $Q_5$ causing them to conduct. Current flows from ground through the emitter-collector path of transistor $Q_4$, load resistance 44, the primary of the feedback transformer 41, and the emitter-collector path of transistor $Q_5$ to the negative input voltage terminal 40. As this current continues to flow, an increasing portion of the load current is shunted around the primary winding by the inductance 45. As before, the decrease in current through the primary winding acts to bring transistors $Q_4$ and $Q_5$ out of saturation. When the transistors are brought out of saturation the decrease in load current causes a circulating current to flow through the feedback transformer primary winding in the opposite direction of the original current flow. This circulating current induces voltages in the secondary windings which immediately cut off transistors $Q_4$ and $Q_5$ and turn on transistors $Q_3$ and $Q_6$. As can be readily understood, a square wave voltage having a peak-to-peak amplitude approximately equal to twice the input voltage is delivered to the load resistance 44.

Although various embodiments of the invention have been described in detail, it is to be clearly understood that the description is by way of example and illustration only. The true spirit and scope of the invention are to be limited only by the terms of the appended claims.

What is claimed is:

1. A source of direct-current provided with first and second terminals of opposite polarity, an alternating-current utilization circuit having an input terminal and an output terminal, and means for connecting said input terminal to each of said source terminals in alternation which comprises, in combination, a plurality of transistor switches each of which has a transconductive path and a control current path, and each of which being characterized in that the energization of said control current path regulates the impedance of said transconductive path, circuit means serially connecting the transconductive paths of pairs of said switches directly across said source, means for connecting said output terminal of said utilization circuit to said first terminal of said source, a feedback transformer having a primary winding and a plurality of secondary windings, said primary winding being connected between said input terminal and the juncture of the transconductive paths of at least one of said pairs of switches, circuit means for connecting each of said secondary windings across the control current path of at least one of said switches for regulating the impedance of said switches in response to the magnitude of current flowing through said primary winding, and inductance means effectively connected in parallel with said primary winding for regulating the time duration of current flow in a given direction through said primary winding.

2. In combination, a source of direct-current voltage, two transistor switches serially connected across said source, and a load circuit connected in parallel with one of said switches, said load circuit comprising a resistance, energy storage means, a transformer having a primary winding and two secondary windings, and a timing inductance, the primary winding of said transformer being serially connected with said resistance and said energy storage means, said timing inductance being connected in parallel with said primary winding, and each of said secondary windings being connected to control the conductivity of one of said transistor switches such that periodic transistor switching occurs, said switching being characterized in that when one transistor switch is open the other is closed.

3. In combination, a direct current voltage source having first and second terminals of opposite polarity, a third terminal, first and second transistor switches each having a transconductive path and a control current path, means for connecting the transconductive path of said first switch between said first and third terminals, means for connecting the transconductive path of said second switch between said second and third terminals, an alternating current utilization circuit, a feedback transformer having a primary winding and first and second secondary windings, said primary winding being connected in series with said utilization circuit between said third terminal and the first terminal of said source, means for connecting said first secondary winding across the control current path of said first switch and for connecting said second winding across the control current path of said second switch such that said switches are actuated in response to the current flowing through said primary winding, and inductance means effectively connected in parallel with said primary winding for regulating the time duration of current flow in any given direction through said primary winding whereby alternating current energy is delivered to said utilization circuit.

4. In combination with a two-terminal source of direct-current energy, means for converting said direct-current energy into alternating-current energy which comprises, in combination, first and second transistor switches, each of said switches having base, emitter and collector electrodes, short circuit means for directly connecting the collector of the first of said transistor switches to the emitter electrode of the second of said transistor switches, circuit means for directly connecting the emitter of said first switch to one terminal of said source, circuit means for directly connecting the collector of said second switch to the other terminal of said source, a feedback transformer having a primary winding and first and second secondary windings, means for connecting the first of said secondary windings between the base and emitter electrodes of said first switch and means for connecting the second of said secondary windings between the base and emitter electrodes of said second switch, a load circuit, circuit means serially connecting said load circuit and said primary winding between the emitter and the collector of said first transistor, and inductance means effectively connected in parallel with said primary winding for regulating the current flow through said primary winding whereby the conductivity state of each of said transistor switches is periodically reversed.

5. In combination with a direct-current voltage source, power conversion apparatus comprising, in combination, four transistor switches each of which is provided with a control electrode and a transconductive path, said transistor switches being grouped into first and second pairs of switches having their transconductive paths serially connected across said voltage source, a load, a feedback transformer having a primary winding and four secondary windings, each of said secondary windings being connected to control the conductivity of an associated transistor switch in response to the current flowing through said primary winding, circuit means serially connecting said load and said primary winding between the juncture of the transconductive paths of said first pair of switches and the juncture of the transconductive paths of said second pair of switches, and inductance means effectively connected in parallel with said primary winding and in series with said load for regulating the time duration of current flow through said primary winding whereby said switches are periodically actuated to cause an alternating current to flow through said load.

References Cited by the Examiner
UNITED STATES PATENTS

| | | | |
|---|---|---|---|
| 2,968,739 | 1/61 | Mohler | 331—113 |
| 2,971,166 | 2/61 | Schultz | 333—113 |
| 3,026,486 | 3/62 | Pintell | 321—2 |

ROY LAKE, *Primary Examiner.*
ROBERT C. SIMS, JOHN KOMINSKI, *Examiners.*